Oct. 13, 1953
L. D. LOGGINS
2,655,571
PRESSURE INDICATOR FOR PNEUMATIC TIRES
Filed May 19, 1950
3 Sheets-Sheet 1
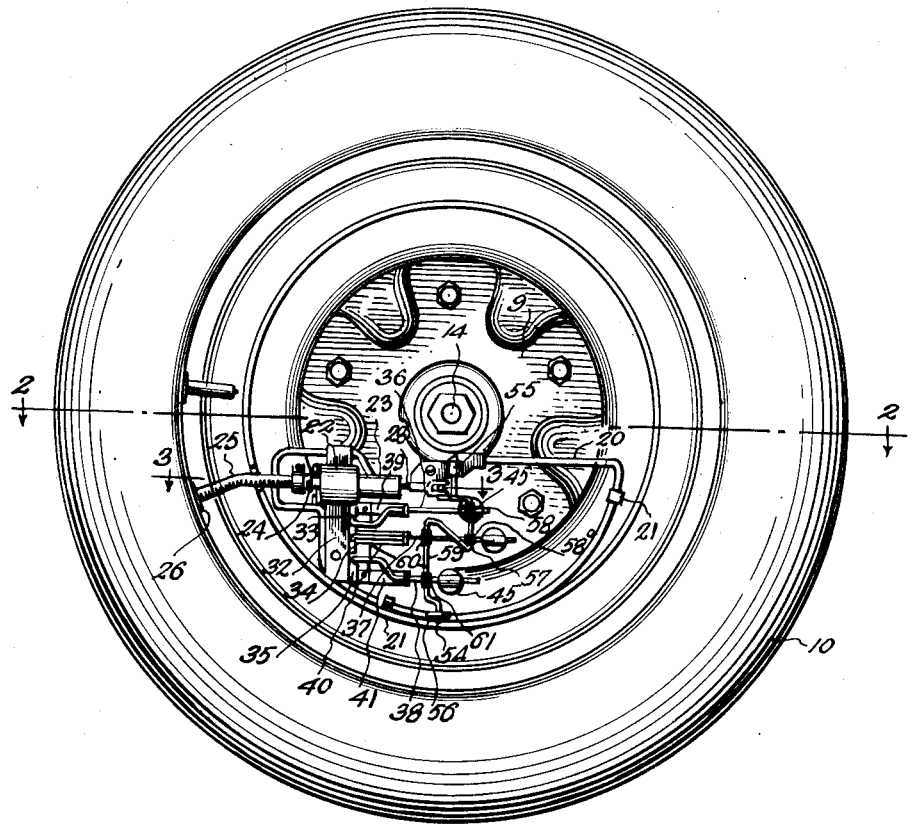
Fig. 1.
Fig. 2.
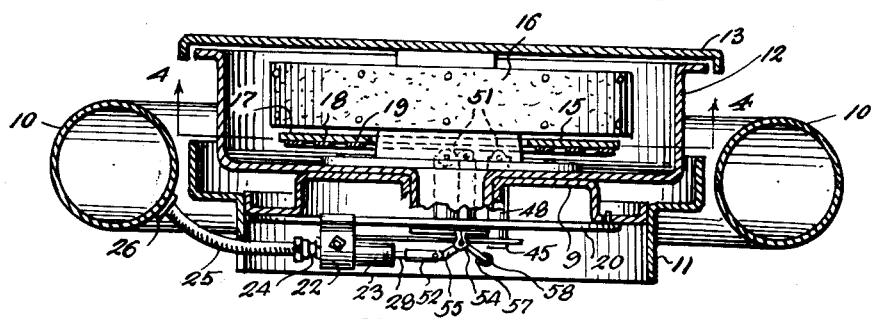
Fig. 3.
INVENTOR.
LUMPKIN DUNCAN LOGGINS
BY Patrick D. Beaver
ATTORNEY Oct. 13, 1953 — L. D. LOGGINS — 2,655,571
PRESSURE INDICATOR FOR PNEUMATIC TIRES
Filed May 19, 1950 — 3 Sheets-Sheet 2
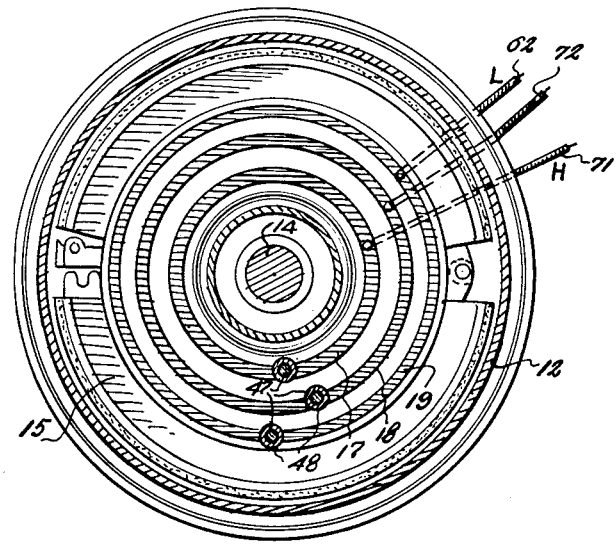
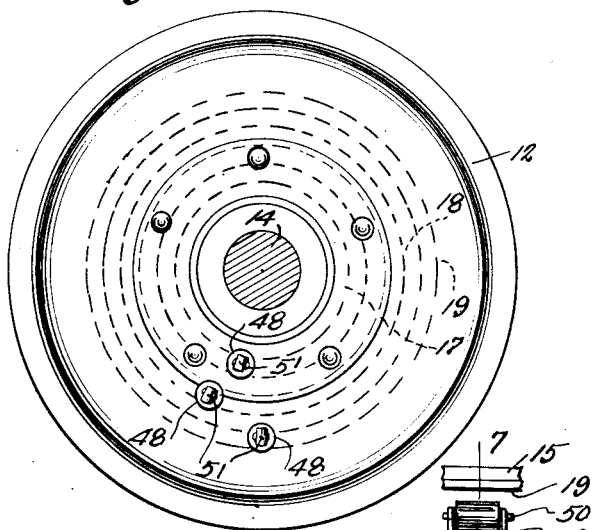
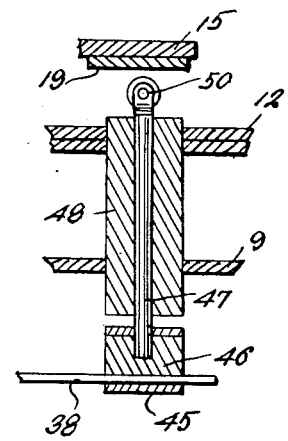
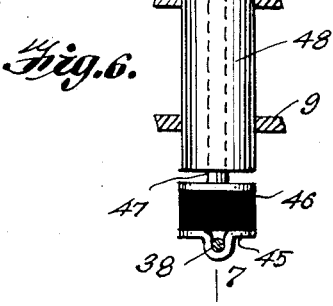
INVENTOR.
LUMPKIN DUNCAN LOGGINS
BY Patrick D. Beaver
ATTORNEY Oct. 13, 1953 L. D. LOGGINS 2,655,571
PRESSURE INDICATOR FOR PNEUMATIC TIRES
Filed May 19, 1950 3 Sheets-Sheet 3

INVENTOR.
LUMPKIN DUNCAN LOGGINS
BY Patrick D. Beavers
ATTORNEY

Patented Oct. 13, 1953

2,655,571

UNITED STATES PATENT OFFICE 2,655,571

PRESSURE INDICATOR FOR PNEUMATIC TIRES

Lumpkin D. Loggins, Commerce, Ga.

Application May 19, 1950, Serial No. 162,880

1 Claim. (Cl. 200—61.25)

The present invention relates to a pressure indicator for pneumatic tires and it consists in the combinations, constructions and arrangements of parts herein described and claimed.

Generally there is provided an apparatus which is associated with each wheel of a vehicle equipped with pneumatic tires and which apparatus is motivated by the pressure contained in its associated tire to indicate through novel electrical switches, contacts and circuits by means of signal lights or other means convenient to the operator whether the particular tire is at normal pressure or whether such tire contains too great or too little air pressure.

It is accordingly an object of the invention to provide an apparatus of the character set forth which is comparatively simple in construction, automatic in its operation and yet effective and efficient in use.

Another object of the invention is to provide an apparatus of the character set forth which will automatically signal to a vehicle operator the pressure condition of each of the tires of such vehicle.

A further object of the invention is to provide, in a device of the character set forth, a novel electrical switch forming a part of the invention.

A still further object of the invention is the provision of a novel electrical contact member forming a part of the invention.

Other and further objects of the invention will become apparent from a reading of the following specification taken in conjunction with the drawings, in which:

Figure 1 is a side elevational view of an embodiment of the invention,

Figure 2 is a sectional view taken along line 2—2 of Figure 1,

Figure 3 is a fragmentary sectional view taken along line 3—3 of Figure 1,

Figure 8:
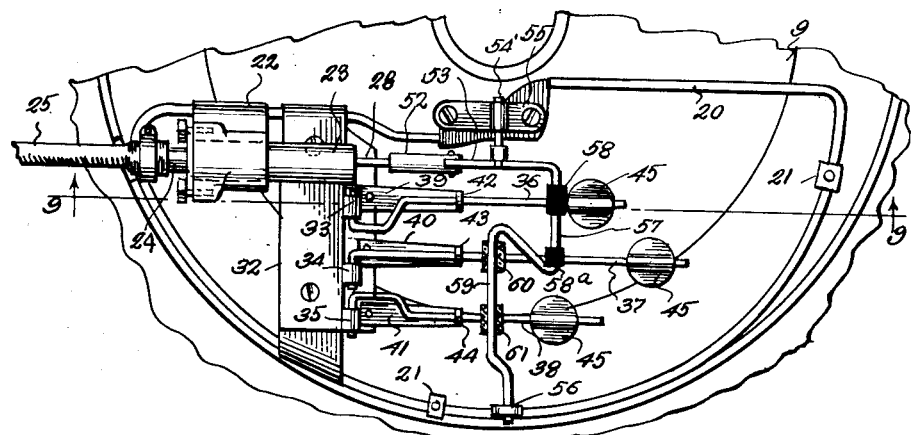
Figure 9:
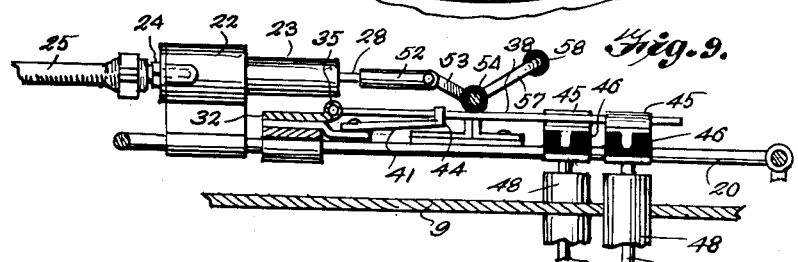
Figure 10:
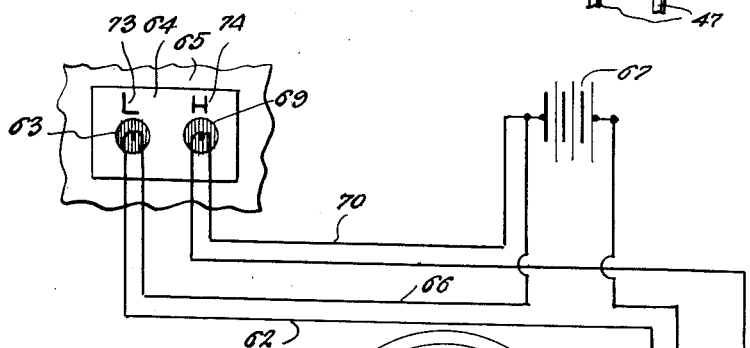

Figure 4 is a sectional view taken along line 4—4 of Figure 2 in the direction of the arrows, Figure 5 is a sectional view likewise taken along line 4—4 of Figure 2 but in the direction opposite to the arrows, Figure 6 is a fragmentary plan view of an electrical contact, Figure 7 is a sectional view taken along line 7—7 of Figure 6, Figure 8 is an enlarged fragmentary elevational view of the apparatus shown in Figure 1, Figure 9 is a fragmentary sectional view taken along line 9—9 of Figure 8, and Figure 10 is a schematic view illustrating the electrical circuits involved with one of the tires which circuits form a part of the present invention.

Referring more particularly to the drawings, there is shown therein a wheel 9 provided with a tire 10, a wheel disc 11, brake drum 12 provided with a cover plate 13 and a wheel spindle 14.

A disc 15 of dielectric material is affixed in any suitable manner about the brakes 16 carried within the brake drum 12 and mounted upon the outer face of the disc 15 is a series of three concentric rings 17, 18 and 19 of electrically conductive material. Affixed to the outer face of the wheel 9 is a framework 20 preferably and as shown formed of wire and which is affixed to the wheel 9 by means of clamps 21 or the like.

Mounted upon the frame 20 by means of a bracket 22 is a cylinder 23 provided at one end with a fitting 24 which connects with a tube 25 of flexible material and which tube, in turn, is connected with a fitting 26 on the tire 10.

A piston 27 is slidably mounted within the cylinder 23 and has connected thereto an outwardly extending rod 28. Within the cylinder 23 there is provided an expansible bulb 29 formed of rubber or other flexible material and connected at its open end with the fitting 24, as indicated at 30, and having its closed end bearing against the piston 27. A compression spring 31 surrounds the rod 28 and bears against the outer end of the cylinder 23.

A vertically extending plate 32 is affixed to the frame 20 and has pivotally connected therewith, as indicated at 33, 34 and 35, contact actuating arms 36, 37 and 38, respectively. Affixed to the plate 32 inwardly of the arms 36, 37 and 38 is a series of springs of flat metal 39, 40 and 41 each of which is respectively provided with an out-turned guide member 42, 43 and 44, which guide members surround, respectively, the arms 36, 37 and 38. The springs 39, 40 and 41 individually act to normally hold their associated arms 36, 37 and 38 outwardly from the wheel 9.

The outer ends of each of the arms 36, 37 and 38 extend through a head 45 affixed to a block 46 of insulative material to which, in turn, is connected a stem 47 which extends inwardly through a collar 48 laterally mounted in the wheel 9.

The inner end of the stem 47 is provided with a yoke 49 whose legs carry an axle 50 upon which is mounted a roller 51. Each of the rollers 51 is adapted, when moved inwardly by its respective arm 36, 37 or 38 to come into rolling contact with one of the contact rings 17, 18 or 19.

The outer end of the rod 28 is connected by means of a line 52 with an arm 53 affixed to and extending outwardly from a shaft 54 which extends substantially in a direction parallel to the sides of the plate 32 and which is pivotally mounted upon the frame 20 by means of brackets 55 and 56. The shaft is provided with a crank 57 having buffer members 58 and 58a mounted thereon and a crank 59 upon which is mounted a pair of buffer members 60 and 61.

The contact ring 19 is connected by means of a wire 62 to a lamp 63 mounted in a panel 64 carried at a point convenient to the operator of the vehicle upon which the present apparatus is attached as, for example, a dashboard 65. The lamp 63 is in turn, connected by a wire 66 to a source of electrical energy as, for example, a vehicle battery 67. The contact ring 18 is connected by a wire 72 to the battery 67. The contact ring 17 is connected by a wire 71 to the lamp 69 and a wire 70 interconnects the lamp 69 and the battery 67.

In operation, it will be apparent that in the event the tire 10 should contain an air pressure below that required for proper operation, that the bulb 29 will shrink in size thereby allowing the spring 31 to move the piston 27 inwardly of the cylinder 23 thus moving the rod 28 likewise in an inward direction. This action causes the link 52 and the arm 53 to turn the shaft 54 in a counterclockwise direction, as viewed in Figure 9 of the drawings, thus moving the crank 57 outwardly and away from the arm 36 while at the same time causing the crank 59 to move inwardly whereupon the buffers 60 and 61 will cause the arms 37 and 38 to move inwardly against the action of the springs 40 and 41 and to thereby carry their respective rollers 51 inwardly into contact with the rings 18 and 19 to thus complete an electrical circuit which includes the lamp 63, the stems 47 of the contacting rollers, the collars 48 of such stems, the wheel 9, the wires 62, 66 and 72, and the battery 67. The lamp 63 has indicia 73 imposed upon the panel 64 adjacent thereto, which indicia indicates to the operator, when the lamp 63 is lighted, that the pressure in the tire 10 is dangerously low.

On the other hand, if the air pressure within the tire 10 becomes too great for safe operation of the vehicle, the bulb 29 will be expanded to thereby move the piston 27 outwardly in the cylinder 23 against the action of the spring 31 to thereby, through the rod 28, link 52 and arm 53, cause a clockwise movement of the shaft 54 to thus cause the buffer members 58 and 58a to impinge against the arms 36 and 37 against the action of the springs 39 and 40 while at the same time releasing the pressure of the buffers 60 and 61 against the arms 37 and 38 and thus allowing the spring 41 to move the arm 38 outwardly with respect to the wheel 9. Such action causes the roller 51 associated with the arm 38 to move out of contact with the ring 19 while causing the rollers 51 and 37 to come into contact with the contact rings 17 and 18 to thereby complete an electrical circuit which includes the lamp 69, the stems 47 of the contacting rollers, the collars 48 of such stems, the wheel 9, the wires 70, 71 and 72, and battery 67. The panel 64 bears indicia 74 adjacent the lamp 69 to indicate, when the lamp 69 is lighted, that the pressure in the tire 10 is too great. It will be understood that while but one wheel and its associated electrical circuits has been shown and described herein that obviously the identical apparatus and circuits may be utilized for each of the wheels of a vehicle and that the panel 64 may contain lamps associated with such additional wheels together with suitable indicia to indicate the condition of air pressure within each of the tires of the vehicle.

It will also be seen that the cranks 57 and 59 lie in the same plane and that when such plane is in parallel relation to the plane of the wheel 9, that none of the buffers 58, 58a, 60 and 61 will bear against any of the arms 36, 37 and 38 and that in such condition neither of the lamps 63 and 69 will be lighted. Obviously in such condition the air pressure within the tire 10 is at its proper lever and the piston 27 is in a position between its innermost position caused by a shrinking of the bulb 29 and its outermost position caused by a swelling of the bulb 29.

While but one form of the invention has been shown and described herein, it will be readily apparent to those skilled in the art that many minor modifications may be made without departing from the spirit of the invention or the scope of the appended claim.

What is claimed is:

A switch for use with a pneumatic tired wheel of an automobile comprising an air pressure responsive device mounted upon the wheel for rotation therewith, a brake drum and a brake mechanism associated therewith, a disc of dielectric material affixed upon said brake mechanism concentrically with said drum, three concentric contact rings mounted upon said disc, three reciprocal contact members extending through said drum and each adapted to contact one of said rings when moved inwardly of said wheel, pressure-operated means connected with said pressure responsive device for selectively moving said reciprocal contact members to contact the center and outer or the center and inner rings, said rings, and said contact members, said pressure reciprocal device including a cylinder, a piston within the cylinder, a piston rod connected to said piston at its inner end and extending outwardly from said cylinder, a shaft, an arm extending radially from said shaft and pivotally connected with the outer end of the piston rod, and means including said shaft for selectively reciprocating said contact members, said last mentioned means including a plate carried on the outer side of the wheel, arms hingedly connected at one end with said plate and extending through the outer ends of the contact members, springs for urging said arms outwardly of said wheels, and a pair of oppositely extending cranks formed in said shaft and lying in the same plane with each other, each of said cranks adapted to bear against selected pairs of said arms to thereby move the contact members inwardly when said shaft is rotated by the movements of the piston.

LUMPKIN D. LOGGINS.

References Cited in the file of this patent

UNITED STATES PATENTS

| Number | Name | Date |
| --- | --- | --- |
| 1,599,846 | Sinclair et al. | Sept. 14, 1926 |
| 2,113,474 | Edmonston et al. | Apr. 5, 1938 |
| 2,283,601 | Erickson | May 19, 1942 |
| 2,481,864 | Peck | Sept. 13, 1949 |